US005564871A

United States Patent [19]
Lagsdin

[11] Patent Number: 5,564,871
[45] Date of Patent: Oct. 15, 1996

[54] CHAMFER MACHINE

[76] Inventor: Andry Lagsdin, 54 King Hill Rd., Hanover, Mass. 02339

[21] Appl. No.: 260,897

[22] Filed: Jun. 16, 1994

[51] Int. Cl.$^6$ ............................... B23C 3/04; B24B 5/00
[52] U.S. Cl. .................... 409/138; 144/28.6; 409/165; 451/286; 451/397
[58] Field of Search ..................... 409/167, 145, 409/165, 205, 138; 144/28.2, 28.3, 28.4, 28.6, 28.7, 28.8, 28.9, 30; 470/86; 451/242, 51, 61, 358, 397, 282, 283, 285, 293, 286, 375, 397, 545, 385, 549, 382, 379, 380, 374, 387, 254, 258, 402, 407

[56] References Cited

U.S. PATENT DOCUMENTS

| | | | |
|---|---|---|---|
| 142,552 | 9/1873 | Barnum et al. | 451/397 |
| 159,518 | 2/1875 | Laurent | 451/412 |
| 244,010 | 7/1881 | Washburn et al. | 451/246 |
| 610,226 | 9/1898 | Carr | 451/397 |
| 660,704 | 10/1900 | Hunnicutt | 451/397 |
| 946,098 | 1/1910 | Beebe | 144/28.8 |
| 961,554 | 6/1910 | Sweet | 451/410 |
| 970,227 | 9/1910 | Homan | 451/279 |
| 992,762 | 5/1911 | Eisenmann | 144/30 |
| 1,145,816 | 7/1915 | Steiner | 451/246 |
| 1,202,400 | 10/1916 | McCullough | 451/285 |
| 1,287,224 | 12/1918 | Causey | 451/285 |
| 1,363,194 | 12/1920 | De Koning | 451/397 |
| 1,545,408 | 7/1925 | Drummond | 144/28.8 |
| 1,851,229 | 3/1932 | Wright | 451/381 X |
| 2,054,159 | 9/1936 | Holcomb | 451/397 |
| 2,209,228 | 7/1940 | Judge | 451/228 |
| 2,369,642 | 2/1945 | Benning | 451/367 X |
| 2,425,897 | 8/1947 | Peterson | 451/283 |
| 2,458,347 | 1/1949 | Christansen | 451/377 |
| 2,614,534 | 10/1952 | Rocks | 451/285 X |
| 3,018,695 | 1/1962 | George | 409/205 X |
| 3,043,060 | 7/1962 | Bell et al. | 451/282 X |
| 3,103,770 | 9/1963 | Carter et al. | 451/282 |
| 3,115,869 | 12/1963 | Freeman | 144/28.8 |
| 3,131,599 | 5/1964 | Macfarlane et al. | 409/180 |
| 3,163,085 | 12/1964 | Wishing | 409/205 X |
| 3,211,446 | 10/1965 | Headrick | 269/902 |
| 3,342,107 | 9/1967 | Margolien | 409/205 |
| 3,753,320 | 8/1973 | Wurscher | 451/375 X |
| 3,878,653 | 4/1975 | Kozlay | 451/375 |
| 4,575,971 | 3/1986 | Keneson | 451/397 X |
| 4,716,689 | 1/1988 | Friel | 451/282 X |
| 5,184,432 | 2/1993 | Wilson | 451/385 |
| 5,210,977 | 5/1993 | Werner | 451/283 |
| 5,259,146 | 11/1993 | Jinkins | 451/398 X |

FOREIGN PATENT DOCUMENTS 768247  8/1934  France ............................... 144/28.6

*Primary Examiner*—William R. Briggs
*Attorney, Agent, or Firm*—Wolf, Greenfield & Sacks, P.C.

[57] ABSTRACT

A chamfer machine for providing a chamfer surface at the end of a workpiece. The machine includes a base and a guide member supported from the base for receiving the workpiece and disposed to enable the workpiece to move under gravity control. A rotary cutter is provided supported from the base with the cutter having a cutting surface adapted to engage the workpiece to provide a chamfering cut thereto as the workpiece is fed toward the cutting surface under substantially only gravity control.

17 Claims, 2 Drawing Sheets

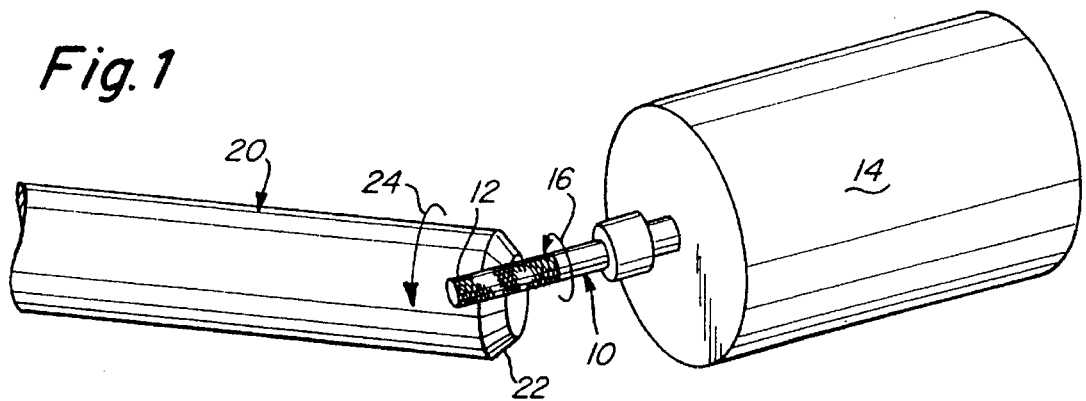
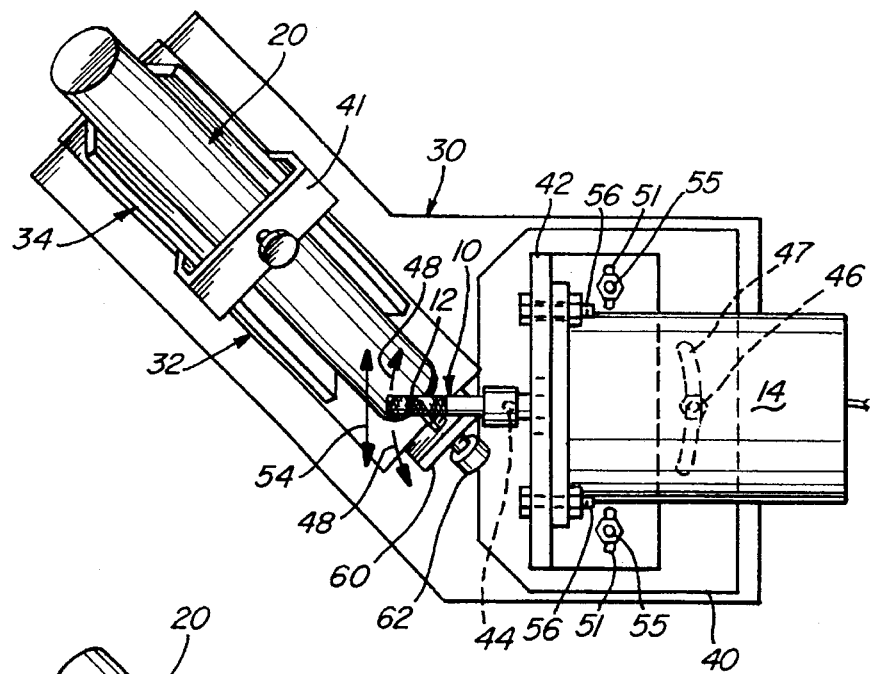
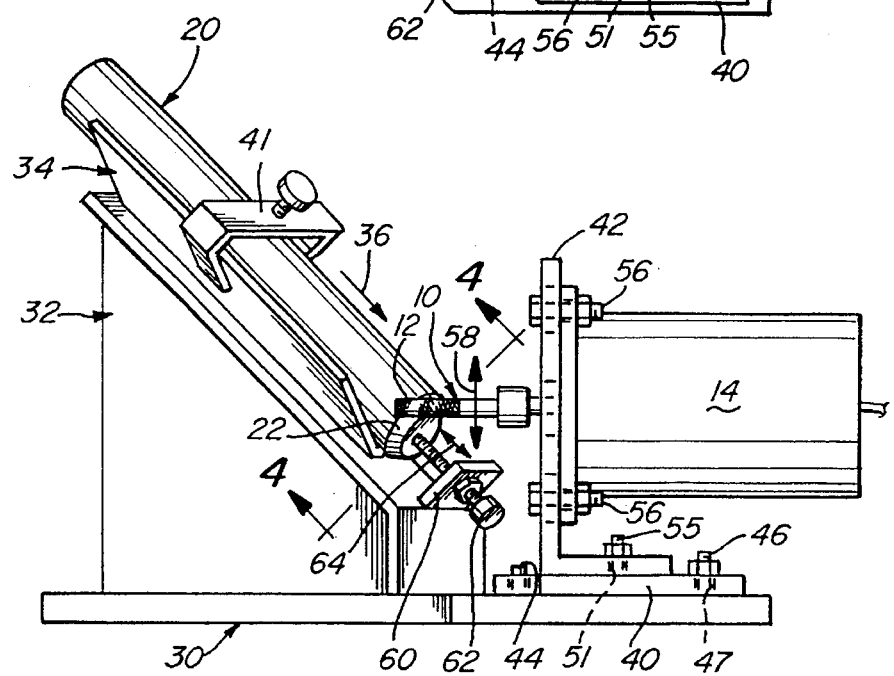

CHAMFER MACHINE

FIELD OF THE INVENTION

The present invention relates in general to a chamfer machine, The invention is also directed to an associated method of providing a chamfer on a workpiece.

BACKGROUND OF THE INVENTION

The prior art discloses various different embodiments of chamfer machines. Some of these chamfer machines simply fixedly secure a workpiece that is brought in contact with a cutting surface. Some of these chamfer machines are of relatively complex construction, many time employing a complex chuck arrangement for holding the workpiece. Many of these machines are also relatively complex in structure in connection with adjustments that they provide to control such parameters as chamfer width and chamfer angle.

Accordingly, it is an object of the present invention to provide a more simplified chamfer machine and associated method of chamfering a workpiece.

SUMMARY OF THE INVENTION

To accomplish the foregoing and other objects of this invention there is provided an apparatus for chamfering the end of a workpiece. This apparatus may comprise a base for supporting a guide member. The guide member is adapted to receive the workpiece and is disposed in a manner to enable the workpiece to move under gravity control. Also supported from the base is a rotary cutter. The rotary cutter has a cutting surface that is adapted to engage the workpiece to provide a chamfering cut thereto. This chamfering cut is provided as the workpiece is fed toward the cutting surface under gravity control. In accordance with a preferred embodiment of the present invention the workpiece is an elongated member capable of rotation about an elongated axis thereof. The rotation of the workpiece is actually caused by the engagement of the rotary cutting surface with the workpiece. A stop is also preferably provided at the working end of the workpiece to control the width of the chamfer.

BRIEF DESCRIPTION OF THE DRAWINGS

Numerous other objects features and advantages of the invention should now become apparent upon a reading of the following detailed description taken in conjunction with the accompanying drawings, in which:

FIG. 1 is a schematic perspective view showing the operation of the principles of the present invention as applied to the chamfering of a rod;

FIG. 2 is a top plane view of a preferred embodiment of the chamfer machine of the present invention;

FIG. 3 is a side elevational view of the chamfer machine of FIG. 2;

DETAILED DESCRIPTION

Figure 4:
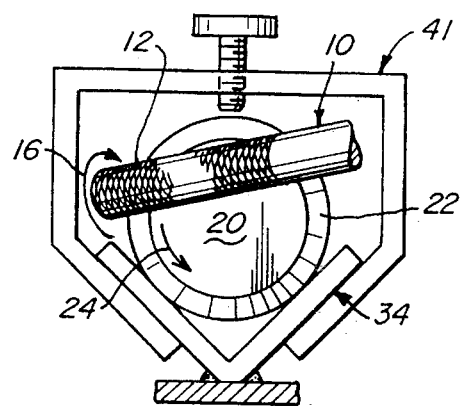
FIG. 4 is a cross-sectional view of the chamfer machine as taken along along 4—4 of FIG. 3.

The chamfer machine or apparatus of the present invention has several unique features. Certainly, one of the advantages of the present invention is its simplicity. For example, it does not require the use of any complicated chuck constructions and, as a matter of fact, in a preferred embodiment of the present invention, the workpiece is simply held in a guide member with the feeding of the workpiece taking place by gravity feed or control. In this regard, the guide member is preferably slanted so that the workpiece, which may typically be a bar or rod that is being chamfered is maintained in contact with the cover by gravity feed. At the same time, this contact between the rotary cutter and the bar or rod also spins the bar or rod so that the chamfer is produced essentially automatically. Again, there is no need for any complex chuck arrangement. The width of the chamfer is controlled by an adjustable stop.

FIG. 1 of the present application is meant to schematically illustrate the principles of the present invention. FIG. 1 shows a rotary cutter 10 having a cutter surface 12 and driven by a motor 14. The motor 14 is preferably a high rpm motor. A typical example would be one operating at 20,000 rpm.

FIG. 1 also shows the workpiece in the form of a bar 20. FIG. 1 is meant to illustrate the engagement of the cutting surface 12 With the bar 20 forming the chamfered annular surface 22. The various adjustments that are made to control the width of the chamfer 22 as well as the angle thereof are discussed hereinafter in connection with FIGS. 2–5. FIG. 6 also described hereinafter illustrates an application for the ,use of the pin or rod, once chamfered.

In FIG. 1 it is noted that the rotary cutter 10 is rotating in the direction of arrow 16. This high speed rotation of the rotary cutter, not only engages the rod 20 but furthermore causes rotation thereof in the direction of the arrow 24 illustrated in FIG. 1. This rotation of the rod 20 is possible because rod 20 is supported in a free manner with essentially the only force acting thereon being that of gravity due to the slanted support configuration of the rod 20.

Now, reference is made to the further details of the chamfer machine as illustrated in FIGS. 2–5 herein. The machine is comprised of a base 30 having supported on one side thereof the guide member 32 that in particular includes a guide piece 34. The guide piece 34 may have a 45° cross-section such as illustrated in FIG. 4 and is adapted to freely support the rod 20. The rod 20 is not clamped within the guide piece 34 but is instead free to move under gravity control within the guide piece 34.

The guide piece 34 in addition to having the 45° cross-section as illustrated in FIG. 4 also is disposed approximately at a 45° angle to the horizontal as illustrated in FIG. 3. This slant angle enables gravity feed as illustrated by the arrow 36 in FIG. 3.

FIGS. 2 and 3 also illustrate a hold down screw member 41. Also note member 41 in FIG. 4 with the screw positioned so as to have a clearance with the workpiece, but at the same time restrict the movement of the workpiece so that it moves primarily only in a longitudinal direction as the chamfering occurs. The member 41 can be made in different sizes and with the adjustment of the associated screw can accommodate a very wide variety of pieces of stock. In this connection, many different diameters of material may be chamfered including both solid bar stock and hollow stock such as a pipe.

FIGS. 2 and 3 also illustrate that, on the other side of the base 30, there is provided a support plate 40 which in turn supports and L-shaped support bracket 42. The bracket 42 in turn supports the high rpm motor 14. The motor 14 in turn supports the rotary cutter 10 which in the views of FIGS. 2 and 3 is illustrated as in contact with the rod 20 providing the chamfering action thereto.

The support piece 40 as illustrated in FIGS. 2 and 3 has at one side thereof a fixed pivot 44 and at the other side thereof an angle adjusting bolt 46. In FIGS. 2 and 3 each of the bolts that are illustrated, of course, have an associated nut coupled thereto. As illustrated in FIG. 2 it is also noted that the piece 40 has a slot 47 to enable an angle of adjustment. FIG. 2 shows the possible rotation of the rotary cutter by means of the arrows 48. This angle of rotation is accomplished by virtue of the bolt and slot arrangement of the piece 40 as illustrated in FIG. 2. Of course, once a preferred position is obtained, the associated nut locks the bolt and locks the position of the piece 40, relative to the base 30.

The bracket 42 at its base also has slots 51 for each receiving a bolt to, enable side-to-side adjustment of the bracket 42. Again, in FIG. 2 the arrow 54 illustrates this side-to-side adjustment as it pertains to the position of the cutting surface 12 of rotary cutter 10.

The motor 14 may be secured to the bracket 42 by means of four bolts 56, each having an associated nut. Each of the bolt and nut arrangements illustrated in the drawings may also have a lock washer associated therewith so that once the proper adjustments are made these bolt and nut combinations can be secured in place. In particular, with regard to FIG. 3 it is noted that some amount of up and down adjustment is provided by those illustrated bolts 56 by the provision of some elongated slots in an up and down direction preferably provided in the vertical leg of the bracket 42. This enables a cutter up and down adjustment as illustrated by the arrow 58 in FIG. 3.

Figure 5:
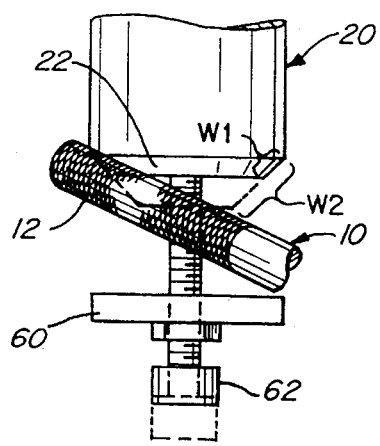
FIG. 5 is a schematic top plane view of the cross-section of FIG. 4 illustrating two different bevel widths in respective solid and phantom lines.
Figure 6:
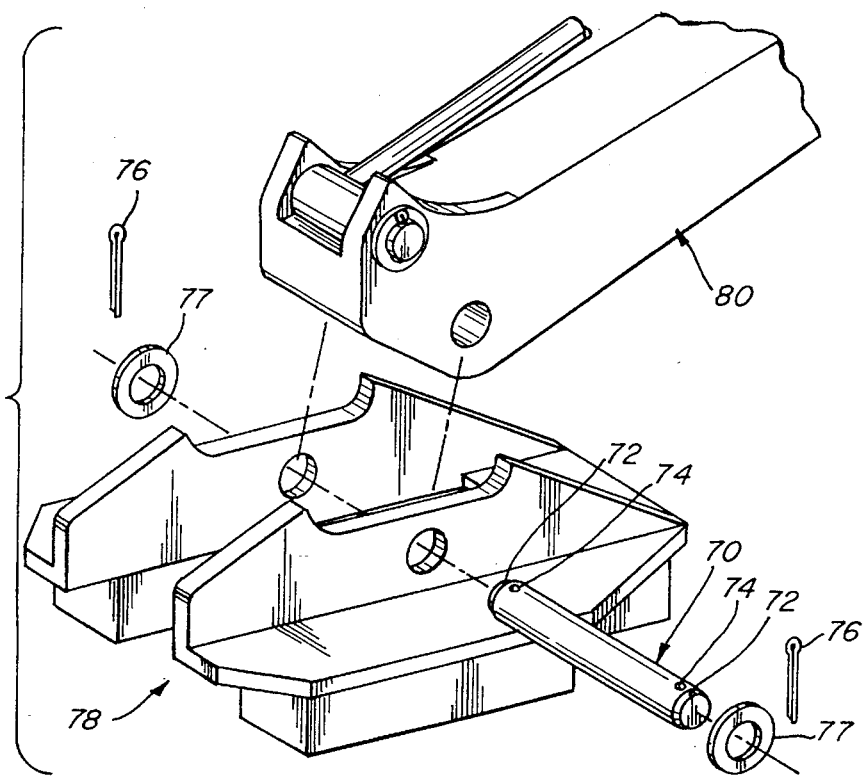
FIG. 6 is an exploded perspective view showing the manner in which the bevelled Din or rod may be utilized, in this example, in the attachment of a stabilizer pad to a back-hoe arm.

FIGS. 2 and 3 along with FIG. 5 also illustrate the rod stop adjustment. This is provided by means of a stop flange 60 associated with the guide member 32. The flange 60 is disposed at a lower position than the V-shaped guide piece 34 and, illustrated in FIG. 3 the flange 60 supports and adjustable stop bolt 62. FIG. 3 also illustrates by arrow 64 the stop adjustment direction. FIG. 5 also illustrates two different examples of the position of the stop adjustment to provide two different widths of bevel. These are shown in respective solid and phantom lines in FIG. 5. Also refer to FIG. 4 in this regard. The width W1 is the smaller width provided in solid position of the adjusting screw 62. The wider width W2 is shown in phantom outline in FIG. 5 and is provided in phantom position of the adjusting screw 62. In addition to the particular width of the chamfer, the particular angle thereof can be adjusted by means of the adjusting bolt 46 as discussed previously in connection with FIGS. 2 and 3.

FIG. 6 is an exploded perspective view that illustrates a use for the rod once chamfered. In FIG. 6 the chamfered rod is illustrated in the form of a chamfered pin 70. It is noted that each of the ends 72 of the pin are chamfered. At each end there is also provided a through hole 74 for receiving respective cotter pins 76.

The particular arrangement of FIG. 6 shows the use of the pin in association with a reversible stabilizer pad 78 which is adapted for positioning at the end of an arm 80 of a back hoe. Please refer to U.S. Pat. Nos. 4,761,021, 4,889,362, 5,050,904 and 5,054,812 for illustrations of the general construction of the stabilizer pad.

In the embodiment of FIG. 6, with the use of the chamfers at each end of the pin it makes it quite easy to insert the pin through holes provided in both the stabilizer pad 78 as well as the arm 80 of the back hoe. The final attachment involves the use of the cotter pins 76 as well as associated washers 77.

It is noted that the motor 14 can be adjusted in a number of different manners. The up and down adjustment provided by bolts 56 and the side to side adjustment provided by the bolts 55 are carried out so as to position the rotary cutter generally in the correct path for engagement with the rod 20. The stop adjustment provided by the adjustment screw 62 determines the width of the chamfer such as illustrated by the two different examples in FIG. 5. The adjusting screw 46 provides for the angular adjustment so as enable the provision of different angles of the bevel. In the one illustrated in FIG. 5 the bevel is approximately 45° but could also be at other angles simply by adjustment of the bolt 46 in the associated slot 47.

In operation, once all of the adjustments have been made and all of the adjusting bolts are fixed in position the rod, bar or pipe is simply disposed in the guide piece 34. The rod automatically engages with the rotary cutter once the rotary cutter is operated and the cutter cuts the chamfer on the end of the rod. Because the rotary cutter is rotating at a sufficient speed, and because the rod is held freely in the guide piece 34, the rod will automatically rotate as illustrated by the arrow 24 in FIGS. 1 and 4. This causes a smooth cutting of the chamfer surface 22 of the rod 20. One can simply insert the rod into the guide piece and then rely upon the position of the stop adjustment 62 to provide the proper chamfer. The operator could essentially operate a number of these devices at the same time as there is not need for any extensive adjustment or monitoring during the chamfering operation.

The use of the machine can further be automated with the use of some type of electrical circuit that could be used to measure continuity between the rod and the adjusting stop 62. Once electrical continuity occurs by virtue of the rod contacting the stop 62 then this could provide an audible or visual signal that the chamfering operation is completed.

Having now described a limited number of embodiments it should now be apparent to those skilled in the art that numerous other embodiments and modifications thereof are contemplated as falling within the scope of the present invention as defined by the appended claims.

What is claimed is:

1. An apparatus for chamfering an end of an elongated workpiece having a length greater than a width and an elongated axis extending along the length, the apparatus comprising:

a base;

a rotary cutter having a cutting surface;

a guide member, supported from the base, and adapted to receive the workpiece and to guide an end of the workpiece to the cutting surface of the rotary cutter, said guide member being constructed and arranged to enable the workpiece to move axially with respect to the guide member under gravity control toward the cutting surface, and to enable the workpiece to freely rotate with respect to the guide member when contacted by the rotary cutter; and a support, extending from the base, for positioning the rotary cutter in juxaposition to the guide member at an end thereof;

wherein said rotary cutter has an axis of rotation and the cutting surface of the rotary cutter includes at least a rotating cutting surface segment extending in the direction of the axis of rotation and rotating there around; and wherein said cutting surface of said rotary cutter both engages the end of the workpiece at the end of the guide member and freely rotates the workpiece about the elongated axis to provide an annular chamfered surface to the end of the workpiece, a stop supported from the base and disposed in line with the workpiece to contact the end of the workpiece and thereby control the width of the chamfered surface on the end of the workpiece.

2. An apparatus as set forth in claim 1 further comprising a motor, supported from the base, that drives said rotary cutter.

3. An apparatus as set forth in claim 2 including adjustable means for supporting the motor from the base and for adjusting a position of the motor with respect to the base.

4. An apparatus as set forth in claim 1 including means for adjusting the position of the rotary cutter, relative to the base, along a first axis.

5. An apparatus as set forth in claim 1 further including, a workpiece hold down member constructed and arranged to confine movement of the workpiece in a direction perpendicular to its axis of rotation, to enable movement of the workpiece, along its axis of rotation, and to enable the workpiece to freely rotate about its axis of rotation under the force of the rotary cutter.

6. An apparatus as set forth in claim 5 wherein said hold down member includes adjustable screw means for accommodating different size workpieces.

7. The apparatus as set forth in claim 1, further including means for adjusting the position of the rotary cutter with respect to the base.

8. The apparatus as set forth in claim 7, further comprising, a workpiece hold down member constructed and arranged to confine movement of the workpiece in a direction perpendicular to its axis of rotation, and to enable movement of the workpiece along its axis of rotation.

9. The apparatus as set forth in claim 8, further comprising a motor, supported from the base, that drives the rotary cutter.

10. The apparatus as set forth in claim 1, wherein said stop comprises an adjustable stop.

11. The apparatus as set forth in claim 3, wherein the base is constructed and arranged to allow adjustment of an angle of the rotary cutter, relative to the base, to control an angle of bevel of the chamfered surface.

12. The apparatus as set forth in claim 4 including means for adjusting the position of the rotary cutter, relative to the base, along a second axis, the second axis being orthogonal to the first axis.

13. The apparatus asset forth in claim 5 wherein said hold down member is adjustable to accommodate different size workpieces.

14. The apparatus as set forth in claim 1, wherein the base is constructed and arranged to enable an orientation of the rotary cutter, with respect to the base, to be varied.

15. The apparatus as set forth in claim 14, further comprising, a workpiece hold down member constructed and arranged to confine movement of the workpiece in a direction perpendicular to its axis of rotation; and to enable movement of the workpiece along its axis of rotation.

16. The apparatus as set forth in claim 1, wherein said guide member is fixed to the base to prevent movement of the guide member relative to the base.

17. An apparatus for chamfering an end of a workpiece, the apparatus comprising:

a base;

a rotary cutter, supported from the base, having an axis of rotation and having a cutting surface that has a length alone the axis of rotation and that rotates about the axis of rotation, the rotary cutter being adapted to engage the workpiece to provide a chamfered surface; thereto;

a guide member, supported from the base, adapted to receive the workpiece to allow chamfering of the end of the workpiece, said guide member being constructed and arranged to enable the workpiece to move with respect to the guide member under gravity control along a path toward the cutting surface and to enable the workpiece to rotate with respect to the guide member when engaged by the cutting surface of the rotary cutter;

a workpiece hold down member, connected to the base, that is constructed and arranged to confine movement of the workpiece in a direction perpendicular to the path and to enable movement of the workpiece along the path, said workpiece hold down member being adjustable to accommodate different size workpieces, a stop supported from the base and disposed in line with the workpiece to contact the end of the workpiece and thereby control the width of the chamfered surface on the end of the workpiece.

* * * * *